United States Patent [19]

Kuzio

[11] 4,253,650
[45] Mar. 3, 1981

[54] HERRING STRIP CUTTER

[76] Inventor: Steven K. Kuzio, 1748 E. 64th Ave., Vancouver, British Columbia, Canada, V5P 2M8

[21] Appl. No.: 142,138

[22] Filed: Apr. 21, 1980

Related U.S. Application Data

[63] Continuation-in-part of Ser. No. 17,586, Mar. 5, 1979, Pat. No. 4,205,832.

[51] Int. Cl.³ .............................................. A22C 25/00
[52] U.S. Cl. ................................................... 269/87.2
[58] Field of Search ...................... 269/87.2, 295, 239, 269/270; 17/70

[56] References Cited

U.S. PATENT DOCUMENTS

| | | | |
|---|---|---|---|
| 2,263,965 | 11/1941 | Fiori | 17/70 X |
| 2,586,732 | 2/1952 | Sohier | 17/70 |
| 2,795,814 | 6/1957 | Gaultney | 17/70 |
| 3,347,296 | 10/1967 | Rothman | 269/87.2 |
| 4,205,832 | 6/1980 | Kuzio | 269/87.2 |

Primary Examiner—Robert C. Watson
Attorney, Agent, or Firm—Smyth, Pavitt, Siegemund, Jones & Martella

[57] ABSTRACT

A device for holding bait fish to permit cutting a strip from the side of the fish. The device comprises a holding block having a depression to hold a fish with a side of the fish protruding. A clamping plate has a further depression formed in it. These depressions are correspondingly shaped to hold opposed sides of a bait fish. A pivotal joint between the holding block and the clamping plate permits variable spacing between the holding block and the clamping plate. Spikes in the depressions engage and assist in locating a fish held between the holding block and the clamping plate. One slot is formed longitudinally in each of the holding block and the clamping plate and there is a guide block for a knife blade positionable within each slot. Control of the projection of each guide block from each channel to control the thickness of the strip cut is permitted.

7 Claims, 3 Drawing Figures

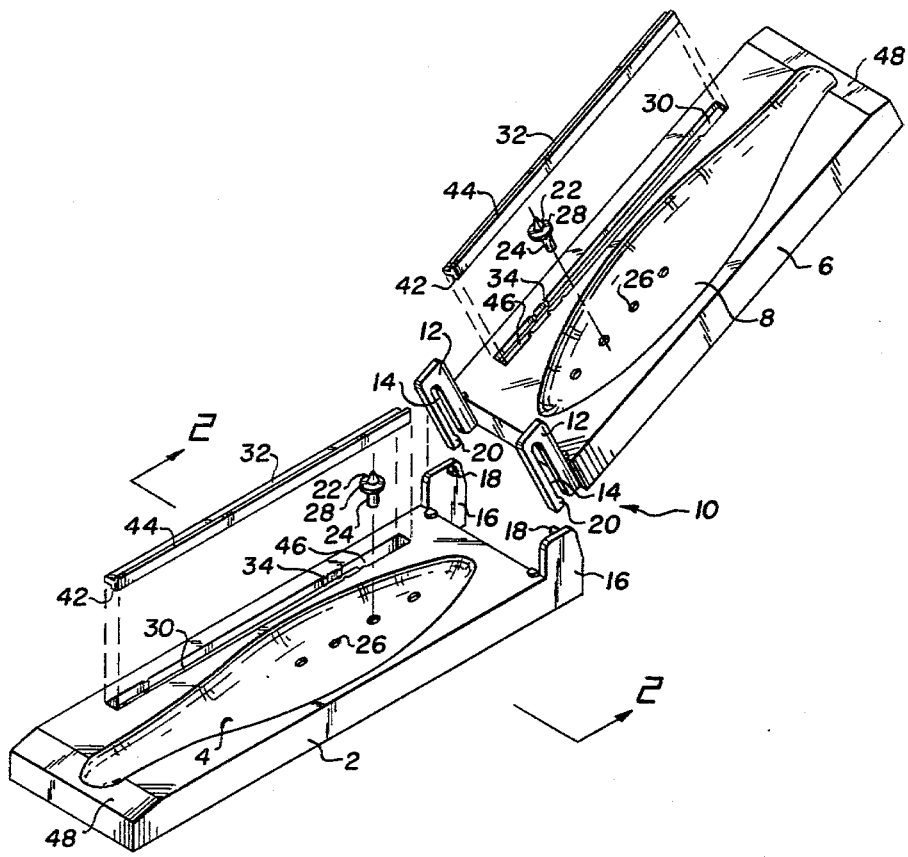
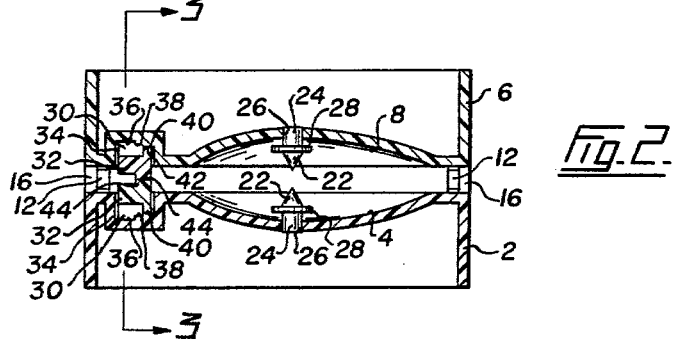
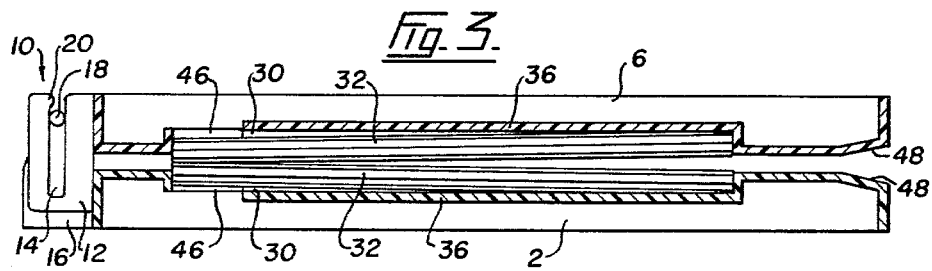

4,253,650

HERRING STRIP CUTTER

CROSS REFERENCE TO RELATED APPLICATION

This application is a continuation-in-part of my application Ser. No. 17,586 filed Mar. 5th, 1979 now U.S. Pat. No. 4,205,832.

FIELD OF THE INVENTION

This invention relates to a device for holding fish, particularly bait fish, to permit cutting of strips from the fish.

DESCRIPTION OF PRIOR ART

Particularly in salmon fishing strips of bait are used. Typically the strips of bait are of fish, usually herring. Although cut herring can be purchased the machinery for cutting the herrings is complicated and, as a result, at current West Coast prices six frozen strips of herring cost about $1.50. Frozen herring cost also about $1.50 and those 6 herrings can be cut into 12 strips. Thus it is clearly advantageous economically to have a device that facilitates cutting of strips by the fisherman. However, there has not previously been any device that will permit the easy cutting of herring strips to allow the fisherman to produce his own bait. There is a need for a cheap, simple device that the fisherman can easily carry with him to permit the purchase of whole frozen herring rather than the already cut strips. If such a device is simple enough, and therefore cheap enough, the economy of purchasing the complete fish rather than the strips will quickly be established.

It is, of course, possible to cut the strips by hand but the results are not good. The strips are not uniform in thickness, particularly bearing in mind that the herring is slippery either because of its natural characteristics or because it is frozen.

SUMMARY OF THE INVENTION

The present invention therefore provides a device that is simple in structure, cheap to make and provides consistently uniform strips of bait fish for use in fishing, particularly salmon fishing. Accordingly, in a first aspect the present invention is a device for holding bait fish to permit cutting a strip from the side of the fish, the device comprising: a holding block having opposed sides and opposed faces; a first depression formed in the first face of the holding block to hold a fish with a side of the fish protruding; a clamping plate having opposed sides and opposed faces; a second depression formed in a first face of the clamping plate; the first and second depressions being correspondingly shaped to hold opposed sides of a bait fish; a pivotal joint between the holding block and the clamping plate, said joint being adapted to permit variable spacing between the holding block and the clamping plate; spikes in the first and second depressions to engage, and assist in locating, a fish held between the holding block and the clamping plate; one slot formed longitudinally in each of the holding block and the clamping plate; a guide block for a knife blade positionable within each slot; and means to enable control of the projection of each guide block from each channel to control the thickness of the strip cut.

BRIEF DESCRIPTION OF THE DRAWINGS

An embodiment of the invention is illustrated in the accompanying drawings in which:

FIG. 1 is a partial exploded view of a device according to the present invention;

FIG. 2 is a section on the line 2—2 in FIG. 1; and

FIG. 3 is a perspective on the line 3—3 in FIG. 2.

DESCRIPTION OF THE PREFERRED EMBODIMENT

The drawings illustrate a device for holding a bait fish to permit cutting a strip from the fish. The device comprises a holding block 2. There is a depression 4 in the block 2 shaped to hold a fish (not shown) with a side of the fish protruding. There is a clamping plate 6 having a depression 8 formed on it. Both depressions 4 and 8 are, of course, correspondingly shaped so that the opposed side of the bait fish can be held in the illustrated device when it is closed that is in a position shown in FIGS. 2 and 3.

There is a pivotal joint 10 between the holding block 2 and the clamping plate 6. The joint 10 is designed so that it permits variable spacing between the holding block 2 and the clamping plate 6. As illustrated the joint comprises first spaced flanges 12 formed on the clamping plate 6. The flanges extend outwardly, longitudinally of the clamping plate 6. There is a slot 14 formed in each flange 12. Second spaced flanges 16 are positioned on the holding block 2 and are positioned so that they are a slide fit over the first flanges 12. There is a lug 18 formed on each flange 16. Lug 18 is positioned to enter the slot 14. The diameter of each lug 18 is about the width of the slots 14 so that good location is provided and the clamping plate 6 can pivot about the lugs 18. In FIG. 1 the clamping plate 6 is shown apart from the holding block 2 and, indeed, the joint 10 is designed so that the block 2 and the plate 6 can easily be separated. However, so that the device will not inadvertently come apart it is desirable to provide small projections 20 at the open mouths of the slots 14 so the lugs 18 need to be forced slightly passed the projections 20 into the slots 14.

The use of the slots 14 permits a wide variation in the separation of the block 2 and the plate 6 when fish of differing widths are to be used as a source of the strip bait.

Spikes 22 are located in the depressions 4 and 8—see FIG. 2. In the preferred embodiment illustrated the spikes 22 are formed with shanks 24 that are a tight friction fit within holes 26 in the bases of the depressions 4 and 8. A flange 28 controls the depth of insertion of the shank 24. The spikes 22 assist in locating a fish clamped between the block 2 and the plate 6. They are of particular value when a knife is moved between the block 2 and the plate 6 as they resist longitudinal movement of the fish relative to the block 2 and the plate 6.

A slot 30 is formed in block 2 and plate 6. The slot 30 runs longitudinally of the block 2 or plate 6 and is dimensioned to receive a guide block 32 for a knife blade that is to be used to cut the strip of bait. As illustrated particularly in FIG. 2, the guide blocks 32 are a close fit within the slots 30. To facilitate the frictional engagement the interior of the slots 30 are desirably provided with small projections 34.

There are means to enable control of the projection of each guide block 32 from out of each slot 30. In the illustrated embodiment the slots 30 are formed with a base 36 a first shoulder 38 and a second shoulder 40—see particularly FIG. 2. Again particularly as illustrated in FIG. 2, the guide blocks 32 are provided with a first shoulder 42 and a second shoulder 44. As illustrated particularly in FIG. 3 each slot 30 is also formed with an opening 46 which simply provides a means of pushing a guide block 32 out of a slot 30 by pushing a knife or the like through the opening 46 against the block 32. The control of the projection of the guide blocks 32 from the slots 30 is as follows. Clearly the first position possible is that the guide blocks 32 need not be used. In these circumstances the strips cut from the bait fish would be equal to the depth of the depression. It has been found that a useful depth for each depression is about 1/5th of an inch.

In a second position guide blocks 32 may be inserted into the slots 30 as illustrated in FIG. 2, that is with the shoulders 44 projecting outwardly. A second position is to reverse the guide blocks 32 so that the shoulders 42 project outwardly but the guide blocks 32 are still in contact with the outermost shoulder 40 in the slots 30. The guide blocks 32 can also be removed and repositioned so that one of the shoulders 42 or 40 may be in contact with the base 36 of the slot 30. By simple selection of the shapes and dimensions of the shoulders on the guide blocks 32 and within the slots 30 varying projections of the upper surface of the guide block from the slot 30 can be achieved and thus increasing thickness of the strip of the bait fish cut. The more the upper surfaces of the guide block 32 projects beyond the slot 30 holding the greater thickness of the strip of bait fish that is cut.

As shown particularly in FIG. 3 it is also desirable to slope the bases 36 of the slots 30 and the first and second shoulders so that generally the depths of the slots increase with distance from the pivotal joint. This has been found to compensate for the natural shape of the bait fish and facilitates slicing of the strip.

Also to facilitate the insertion of the knife between the guide blocks 32 it is desirable that the holding block 2 and the clamping plate 6 be provided with chamfers 48 as particularly illustrated in FIGS. 1 and 3.

To use the device according to the invention a bait fish, for example herring, is placed in the depression 4 in the holding block 2 with its head towards the joint 10 and the tail extending past the chamfer 48. The back of the fish is positioned adjacent the slots 30. The bait fish is clamped into position by pivoting the clamping plate 6 about the lugs 18 to hold the fish in the required position. Spikes 22 pierce the fish to facilitate this holding. Slight pressure is applied towards the tail of the fish, that is remote from the pivotal joint 10. A well sharpened knife is then moved along the upper surface of the holding block 2 or along the upper surface of a guide block 32 if such a block is in position. The knife is moved as far as the gills of the fish. The block is then turned over and the procedure repeated to cut a second strip from the other side of the fish, that is by moving the knife along either the flat upper surface of the clamping plate 6 or the flat upper surface of a guide block 32. Once the cutting in the device is completed the herring is removed and the strips are cut free at the gills. Trimming is carried out as desired. As indicated above thicker strips may be cut by placing the guide blocks 32 in the slots 30 or, of course, by varying the position of the guide blocks 32 in the slots 30 to control the projection of the upper surface of the guide block 32 out of the slot 30.

The device of the present invention may be easily molded for example from plastics such as nylon, ABS or PVC.

I claim:

1. A device for holding bait fish to permit cutting a strip from the side of the fish, the device comprising:
   a holding block having opposed sides and opposed faces;
   a first depression formed in the first face of the holding block to hold a fish with a side of the fish protruding;
   a clamping plate having opposed sides and opposed faces;
   a second depression formed in a first face of the clamping plate;
   the first and second depressions being correspondingly shaped to hold opposed sides of a bait fish;
   a pivotal joint between the holding block and the clamping plate, said joint being adapted to permit variable spacing between the holding block and the clamping plate;
   spikes in the first and second depressions to engage and assist in locating a fish held between the holding block and the clamping plate;
   one slot formed longitudinally in each of the holding block and the clamping plate;
   a guide block for a knife blade positionable within each slot; and
   means to enable control of the projection of each guide block from each channel to control the thickness of the strip cut.

2. A device as claimed in claim 1 in which there are a plurality of holes formed in the base of each of the first and second depressions;
   said spikes being formed with shanks that are a friction, removable fit in the hole.

3. A device as claimed in claim 1 in which said joint adapted for pivotal movement comprises first spaced flanges formed on one of said holding block and said clamping plate and extending outwardly of said block or said plate;
   a slot formed in each first flange;
   second spaced flanges formed on the other of said holding block or said clamping plate and positioned to be a slide fit over the first flanges; and
   a lug extending from each of said second flanges and positioned to engage a slot in a first flange.

4. A device as claimed in claim 1 in which each slot formed longitudinally in the holding block and the clamping plate is formed with at least one internal shoulder;
   shoulders formed on at least two edges of each guide block, each shoulder projecting from the guide block by an amount different from the other shoulder whereby, by inserting different guide block shoulders into a slot to contact an internal shoulder in the slot, differing projections for the guide block can be achieved.

5. A device as claimed in claim 1 in which the bases of the slots formed longitudinally in each of the holding block and the clamping plate and the shoulders in the slots are sloped, the depth of the slots increasing with distance from the pivotal joint.

6. A device as claimed in claim 1 including openings formed in the base of the slot formed longitudinally in each of the holding block and the clamping plate, said openings extending through said block or said plate to facilitate removal of the guide blocks from the slots.

7. A device as claimed in claim 1 in which the ends of the plate and the block are chamfered at the ends remote from the pivotal joints to assist introduction of a knife between the clamping plate and the holding block.

* * * * *